UNITED STATES PATENT OFFICE.

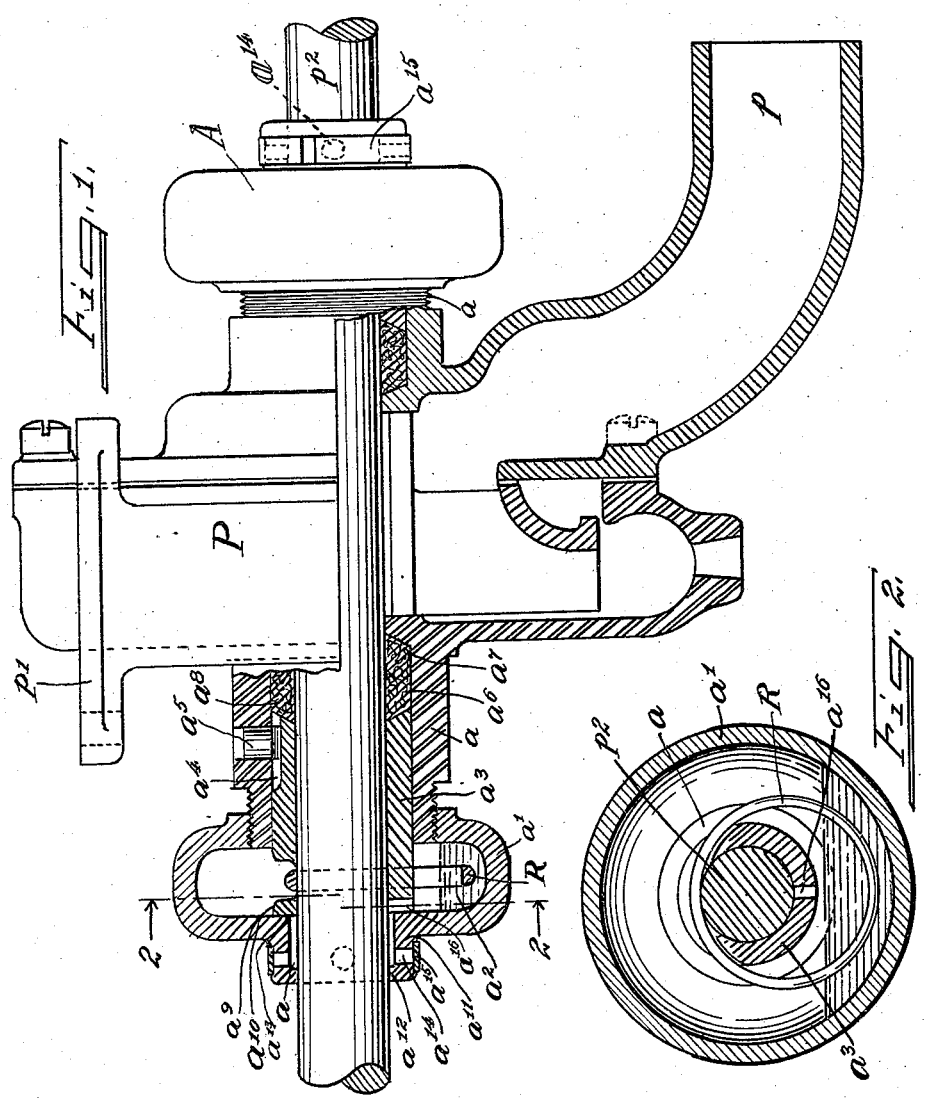

WILLIAM B. SPARKS, OF CINCINNATI, OHIO.

RING-OILED GLAND.

1,420,585. Specification of Letters Patent. Patented June 20, 1922.

Application filed November 15, 1920. Serial No. 424,028.

*To all whom it may concern:*

Be it known that WILLIAM B. SPARKS, a citizen of the United States, residing at Cincinnati, in the county of Hamilton and State of Ohio, has invented new and useful Improvements in Ring-Oiled Glands, of which the following is a specification.

My invention relates to glands and particularly to means for oiling them.

With all existing types of glands the lubrication is imperfect and requires considerable attention to keep the apparatus on which they are used in even fairly satisfactory working order.

My improvements overcome these difficulties and ensure positive and complete lubrication of the gland and bearing as long as there is oil enough in the reservoir for the ring to dip into.

My improvements permit the location of the packing between the liquid being pumped and the bearing to be oiled; preventing the liquid from getting into the bearing and the lubricant from getting into the liquid.

The particular embodiment of my invention selected for illustration is a gland as used on the water pump of automobiles:—

Figure 1, is a side elevation of an automobile pump with one of my improved glands on each side, with one gland and other parts in section, and Fig. 2, is a cross section on the line 2—2 of Fig. 1.

Referring now to the drawings, P is a centrifugal pump, with inlet $p$ and outlet $p^1$, and drive shaft $p^2$, with gland A on either side of the pump.

The outer or fixed element of the gland is an outwardly extending annular boss $a$ on the pump housing, and threaded at its outer end to receive the nut $a^1$ made hollow to form a reservoir $a^2$ for oil.

The inner, or adjustable element of the gland, is a sleeve $a^3$ having a slot-and-feather connection with the boss $a$ by a pin $a^5$ inserted radially through the boss into a longitudinal groove $a^4$ on the sleeve to prevent rotation of the sleeve $a^3$ while permitting its longitudinal adjustment. Suitably beveled surfaces $a^6$ on the sleeve $a^3$ and $a^7$ on the fixed element $a$, are provided as usual to ensure the packing $a^8$ being pressed securely against the shaft $p^2$ by the inward movement of the sleeve $a^3$. The outer end $a^9$ of the sleeve $a^3$ contacts with the inner surface $a^{10}$ of the nut $a^1$ next the shaft $p^2$, and as the nut $a^1$ is turned onto the boss $a$ the sleeve $a^3$ is pressed in against the packing $a^8$.

The nut $a^1$ has an outwardly extending axial boss $a^{11}$, through which the shaft $p^2$ passes at $a^{12}$ with a close running fit. Within this boss is an annular space $a^{13}$, connected with the exterior by one or more oil holes $a^{14}$, preferably of such number and so spaced as to permit oiling in whatever position the nut $a^1$ is in. A rotatable band $a^{15}$, preferably of spring steel, keeps the oil holes $a^{14}$ closed except when rotated to expose one of them when oiling. A hole or recess $a^{16}$ in the sleeve $a^3$ forms an oil passage from the annular space $a^{13}$ to the oil reservoir $a^2$, so that oil may be supplied to the reservoir through the oil holes. The space $a^{13}$ and passage $a^{16}$ also combine to receive and drain back to the reservoir $a^2$ excess oil that works past the outer end of the sleeve $a^3$.

The sleeve $a^3$ has a slot $a^{17}$ on its upper side to receive a ring R which rides on the shaft $p^2$ and dips down into the oil in the reservoir $a^2$, and ensures thorough oiling of the shaft and gland as long as there is oil enough in the reservoir to touch the ring.

As shown in the drawings, the nuts $a^1$ are to be rotated by hand, as the use of wrenches is not required in such structures.

I claim as my invention and desire to secure by Letters Patent of the United States:—

1. A packing gland for a rotating shaft having two non-rotating telescoping members, means for adjusting the relative longitudinal positions of said members, a slot through the top side of the inner member, an oil ring resting in said slot and riding upon the shaft and an oil reservoir into which the ring dips.

2. A packing gland for a rotating shaft having in combination a fixed outer member, a non-rotating longitudinally slidable inner member, means for longitudinally adjusting the position of the inner member, a slot through the top side of the inner member, an oil ring in said slot, and an oil reservoir into which the ring dips.

3. A packing gland for a rotating shaft having in combination a fixed outer member, a non-rotating longitudinally slidable inner member, a slot through the top side of the inner member, an oil ring resting loosely within said slot upon said shaft, and combined means for adjusting the longitudinal position of the inner member and for supplying a reservoir for oil into which the ring dips.

4. A packing gland for a rotating shaft, having in combination a fixed outer member, a non-rotating longitudinally slidable inner member, a transverse slot through the top side of the inner member, an oil ring resting loosely within said slot upon said shaft, a packing nut for adjusting the longitudinal position of the inner member, said nut made hollow to provide a reservoir for oil into which the ring dips, an external boss on said nut with oil holes and an oil passage to convey oil from the exterior of said boss to the inner member of the gland next the oil reservoir, and a passage through the lower side of said inner member to convey oil to the reservoir.

5. A packing gland for a rotating shaft having in combination a fixed outer member, a non-rotating longitudinally slidable inner member, a transverse slot through the top side of the inner member, an oil ring resting loosely within said slot upon said shaft, a packing nut for adjusting the longitudinal position of the inner member, said nut made hollow to provide a reservoir for oil into which the ring dips, an external boss on said nut with oil holes and an oil passage to convey oil from the exterior of said boss to the inner member of the gland next the oil reservoir, a passage through the lower side of said inner member to convey oil to the reservoir, and means for closing the outer openings of said oil holes.

6. In combination with a ring oiled gland, a packing nut enlarged and hollowed to form a reservoir for oil into which the ring dips, and an outwardly extending axial boss making at its outer edge a close running fit with the shaft and within the boss an annular oil space next the shaft, means for introducing oil into said space from the exterior of said boss and a passage connecting said annular space with said oil reservoir.

7. In combination with a gland carried into an oil reservoir and having an opening at the top side to admit oil to the shaft, an enlarged oil-carrying ring resting upon the revolving shaft in said opening and dipping into the oil contained in such reservoir.

In testimony whereof I have hereunto set my hand in presence of two subscribing witnesses.

WILLIAM B. SPARKS.

Witnesses:
NORMA D. BERGER,
CARL PHARES.